United States Patent
He

(10) Patent No.: US 9,003,940 B2
(45) Date of Patent: Apr. 14, 2015

(54) DUAL FUNCTIONAL ELECTRIC SAW

(71) Applicant: Caibai He, Miramar, FL (US)

(72) Inventor: Caibai He, Miramar, FL (US)

(*) Notice: Subject to any disclaimer, the term of this patent is extended or adjusted under 35 U.S.C. 154(b) by 160 days.

(21) Appl. No.: 13/929,163

(22) Filed: Jun. 27, 2013

(65) Prior Publication Data

US 2014/0208914 A1 Jul. 31, 2014

(30) Foreign Application Priority Data

Jan. 29, 2013 (CN) .................. 2013 2 0050650 U

(51) Int. Cl.
| | |
|---|---|
| *B23D 45/06* | (2006.01) |
| *B23D 45/02* | (2006.01) |
| *B23D 47/02* | (2006.01) |
| *B27B 5/16* | (2006.01) |
| *B27B 5/20* | (2006.01) |

(52) U.S. Cl.
CPC ............ *B23D 45/062* (2013.01); *B23D 45/027* (2013.01); *B23D 47/025* (2013.01); *B27B 5/165* (2013.01); *B27B 5/202* (2013.01); *B27B 5/207* (2013.01)

(58) Field of Classification Search
CPC .............. B23D 45/027–45/068; B23Q 37/002; B27B 5/202; B27B 5/165; B27B 5/207
USPC ............ 83/477.2, 469, 574, 471.3, 477, 473, 83/483, 485, 486–489
See application file for complete search history.

(56) References Cited

U.S. PATENT DOCUMENTS

| | | | | | |
|---|---|---|---|---|---|
| 2,577,206 | A | * | 12/1951 | Patterson ..................... | 144/1.1 |
| 2,719,547 | A | * | 10/1955 | Gjerde ....................... | 83/471.3 |
| 3,570,564 | A | * | 3/1971 | Bergler ....................... | 83/471.3 |
| 4,465,114 | A | * | 8/1984 | Schumacher ............... | 144/286.1 |
| 5,437,319 | A | * | 8/1995 | Garuglieri .................. | 144/286.1 |
| 5,570,641 | A | * | 11/1996 | Garuglieri .................. | 108/13 |
| 7,000,658 | B1 | * | 2/2006 | Soukiassian et al. ......... | 144/3.1 |
| 2006/0005678 | A1 | * | 1/2006 | Gehret et al. ................ | 83/471.3 |
| 2006/0005679 | A1 | * | 1/2006 | Gehret et al. ................ | 83/471.3 |
| 2006/0005680 | A1 | * | 1/2006 | Gehret et al. ................ | 83/471.3 |
| 2006/0005681 | A1 | * | 1/2006 | Lambert et al. ............. | 83/471.3 |
| 2006/0005682 | A1 | * | 1/2006 | Gehret et al. ................ | 83/471.3 |
| 2006/0011034 | A1 | * | 1/2006 | Gehret et al. ................ | 83/477.2 |
| 2006/0011038 | A1 | * | 1/2006 | Gehret et al. ................ | 83/581 |
| 2006/0048617 | A1 | * | 3/2006 | Gehret et al. ................ | 83/473 |
| 2006/0201299 | A1 | * | 9/2006 | Santa Ana .................. | 83/468.3 |
| 2007/0089584 | A1 | * | 4/2007 | Howard ..................... | 83/477.2 |
| 2007/0234864 | A1 | * | 10/2007 | Bettacchini ................. | 83/471.3 |
| 2008/0066598 | A1 | * | 3/2008 | Ouellette .................... | 83/477.2 |
| 2010/0269660 | A1 | * | 10/2010 | Janson ........................ | 83/471.3 |
| 2014/0208915 | A1 | * | 7/2014 | He .............................. | 83/471.3 |

* cited by examiner

*Primary Examiner* — Sean Michalski

(74) *Attorney, Agent, or Firm* — Enshan Hong; VLP Law Group LLP

(57) ABSTRACT

A dual functional electric saw, comprising a saw base, a saw body and a connection mechanism whereby the saw base and the saw body are jointed together, wherein said connection mechanism comprises a connection beam being a fastener of said saw base, a load-bearing column connected with said connection beam, sliding kits installed on the load-bearing column for leading the horizontal motion of said saw body, and an angle regulation fitting being capable of adjusting the cutting angle between work piece and saw disc, with the sliding kits being an axis, one end of the angle regulation fitting is connected to the sliding kits while the other end is connected to the saw body; said saw base comprises a dismountable cover kit and a stand set having a chamber being capable of accommodating the saw body.

4 Claims, 3 Drawing Sheets

DUAL FUNCTIONAL ELECTRIC SAW

BACKGROUND OF THE INVENTION

1. Field of the Invention

The present invention relates to electric saw, in particular a dual functional electric saw.

2. Description of the Related Art

People always need precise wood machining during indoor and outdoor renovation, or furniture manufacture. Power saws, especially miter saw and table saws, are therefore indispensable and most helpful. Both miter saws and table saws are useful for precise wood processing. A miter saw is often used in wood cutting, and a table saw is commonly used for panel cutting. Under different situations, different types of power saws are required. Miter saw and table saws are more frequently used than others. However, it is quite inconvenient to bring two types of saws to different working locations.

SUMMARY OF THE INVENTION

One objective of the present invention is to overcome the difficulty of bringing two saws together, and provides a dual functional electric saw being able to play both roles of a miter saw and a table saw. The electric saw of the present invention has a compact structure, low cost, high efficiency, and is easy to handle.

For achieving the objective mentioned above, the present invention adopts the following technical solution:

A dual functional electric saw comprises a saw base, a saw body and a connection mechanism whereby the saw base and the saw body are jointed together. The connection mechanism comprises a connection beam being a fastener of the saw base, a load-bearing column connected with the connection beam, a sliding kit installed on the load-bearing column for leading the horizontal motion of the saw body, and an angle regulation fitting being capable to adjust the cutting angle between work piece and saw disc, with the sliding kit being the axis, one end of the angle regulation fitting is connected to the sliding kit while the other end is connected to the saw body. Moreover, the saw base comprises a dismountable cover kit and a stand set having a chamber being capable of accommodating the saw body.

Further, the sliding kit comprises a sliding rod and a guiding tube used for the movement of the sliding rod, said sliding rod penetrates through the guiding tube and is connected with the saw body, the guiding tube is fixed with the load-bearing column in forms of screw connection and fasten pin holding.

Further, the stand set comprises an adjustable frame having a chamber being capable of accommodating the saw body and a stationary stand around the adjustable frame for holding the adjustable frame.

Further, the dismountable cover kit comprises a demountable cover of the adjustable frame and a removable cover of the stationary stand.

Further, the connection beam is connected to the middle part of the outer wall of the chamber in the adjustable frame.

Compared with the prior art, the present invention provides the following benefits:

The present invention can be used in two forms which are a miter saw and a table saw. It brings users an impact structure with simple operation and portability.

In addition, because of the wheels equipped at the bottom of the adjustable frame, operators are able to adjust the position of the saw disc and make a cutting from various directions, without moving the demountable cover.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

A preferred embodiment of the present invention will be described hereinafter with reference to the drawings:

List of reference numbers in the figures is provided below:
101—saw disc:
102—saw body;
103—removable cover;
104—demountable cover;
105—connection screw;
106—fasten pin;
107—fasten pin;
108—connection screw;
109—load-bearing column;
110—angle regulation fitting;
111—sliding kits;
112—adjustable frame;
113—stationary stand;
114—fasten pin;
115—connection screw;
116—connection beam.

Figure 1:
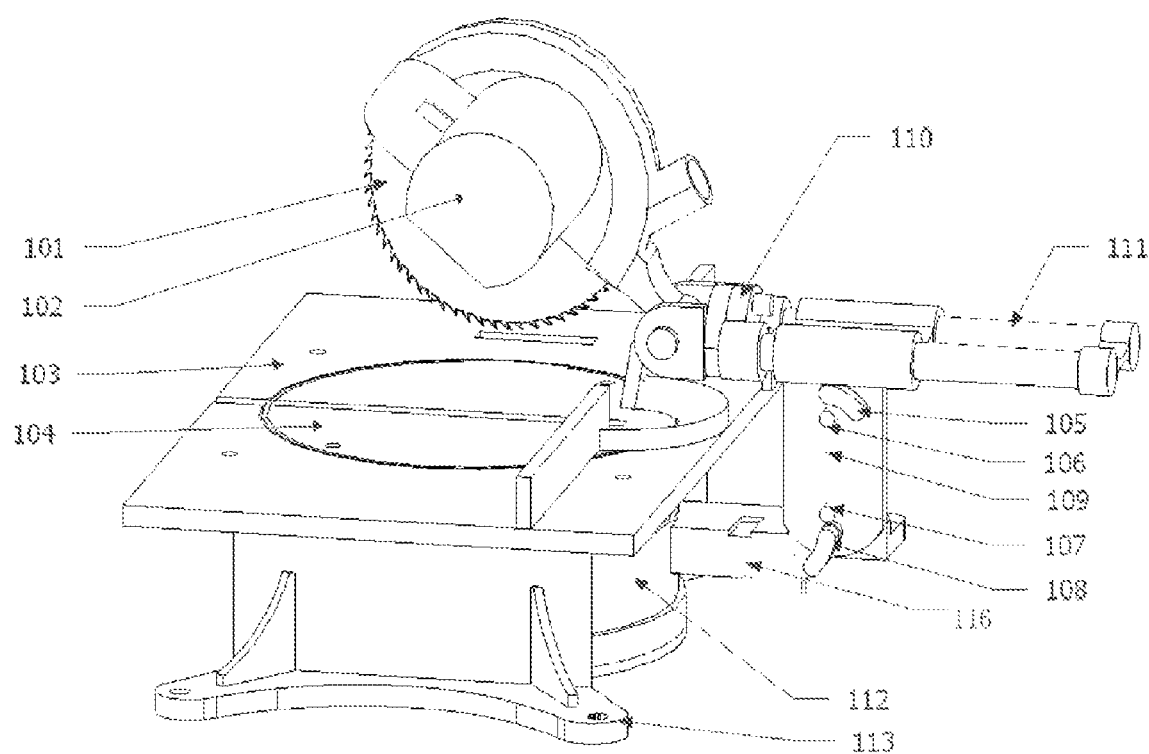
FIG. 1 is a structure schematic view of the present invention when it is in the form of a miter saw.
Figure 2:
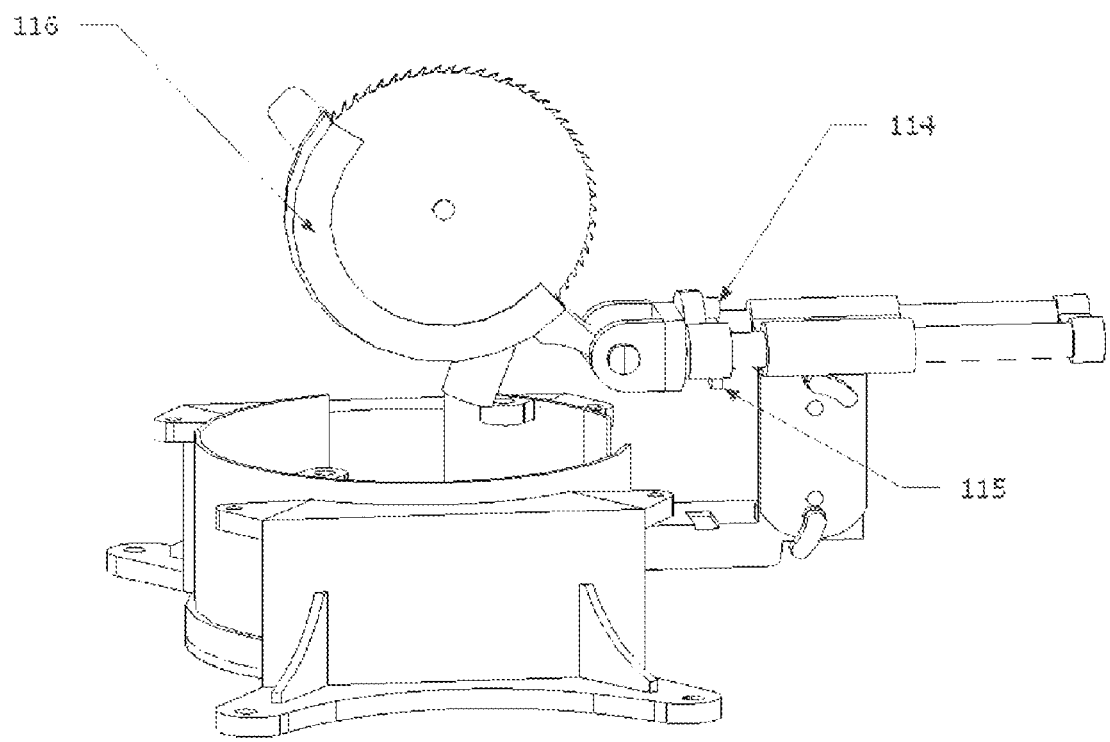
FIG. 2 is a schematic view of the present invention when its saw body is turned around.
Figure 3:
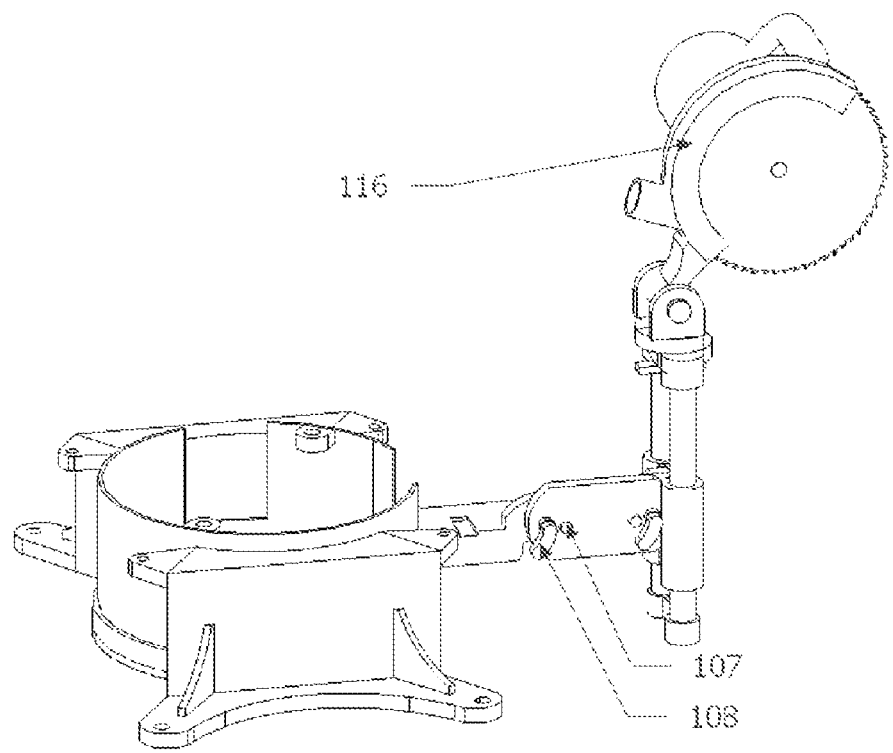
FIG. 3 is a schematic view of the present invention when the load-bearing column is turned into a horizontal line and the sliding kits are upwards.
Figure 4:
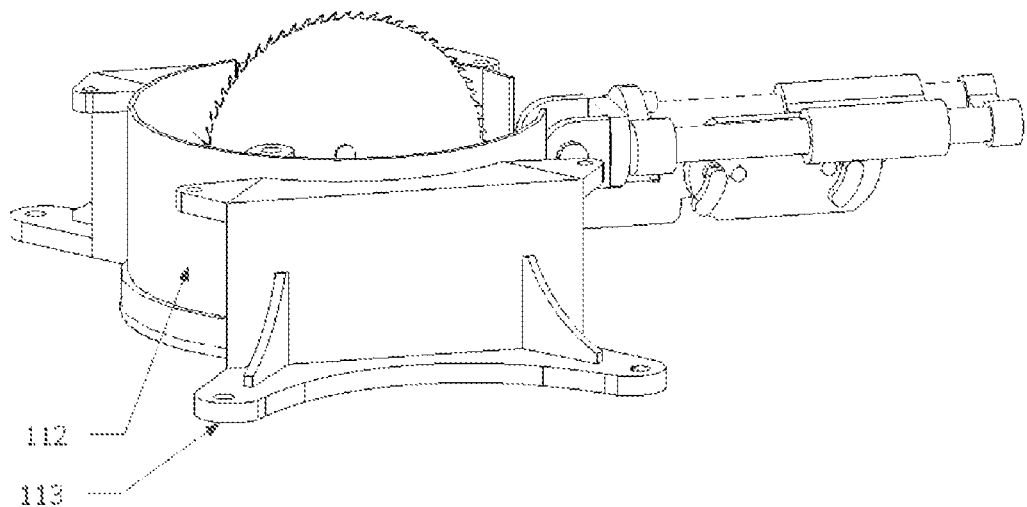
FIG. 4 is a schematic view of the present invention when the saw body is placed inside the chamber horizontally.
Figure 5:
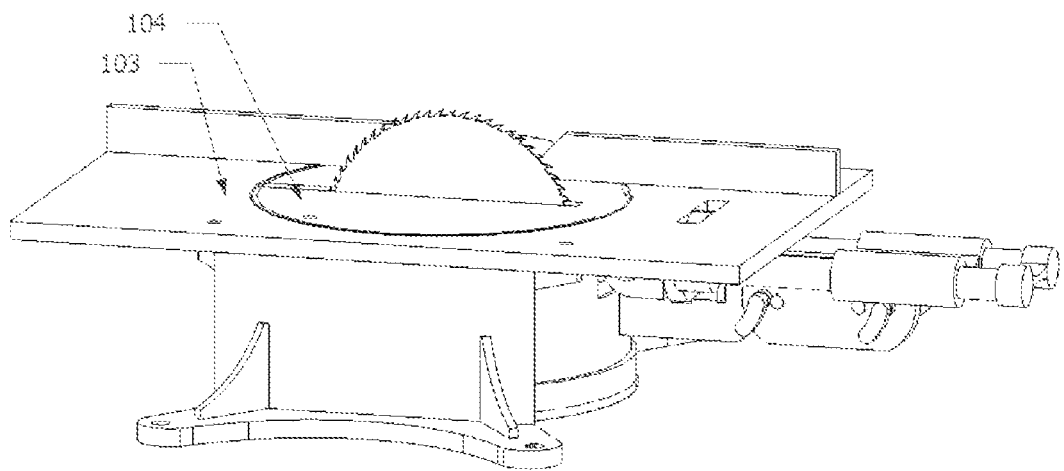
FIG. 5 is a schematic view of the present invention when the saw body is placed inside the chamber horizontally and the dismountable cover kit has been closed, therefor providing a table saw.

Referring to FIG. 1, a dual functional electric saw in accordance with an embodiment of the present invention comprises a saw base, a saw body 102 and a connection mechanism whereby the saw base and the saw body are jointed together. The connection mechanism comprises a connection beam 116 being a fastener of the saw base, a load-bearing column 109 connected with the connection beam, and sliding kits 111 installed on the load-bearing column 109 for leading the horizontal motion of the saw body 102, and an angle regulation fitting 110 being capable of adjusting the cutting angle between work piece and saw disc, with the sliding kits 111 being the axis, one end of the angle regulation fitting 110 is connected to the sliding kits 111 while the other end is connected to the saw body 102.

Saw body 102 comprises saw disc 101 and a motor. The angle regulation fitting 110 is connected with saw body 102 and load-bearing column 109 respectively by shafts. Angle regulation fitting 110 makes saw body 102 rotates along with the sliding rods axially, thus the cutting position and direction of the disc can be variable. While the saw base comprises a dismountable cover kit and a stand set having a chamber being capable of accommodating the saw body. The stand set comprises an adjustable frame 112 having a chamber being capable of accommodating the saw body and a stationary stand 113 around the adjustable frame 112 for holding the adjustable frame 112.

Sliding kits 111 comprise sliding rods and passages used for the movement of the sliding rods, the passages are the hollow-structured guiding tubes. The sliding rods 111 penetrate through the guiding tubes and are connected with the saw body 102, and the guiding tubes are fixed with the load-bearing column 109 in forms of screw connection 105 and fasten pin 106.

To place the saw body 102 into the chamber, the connection beam 116 is connected to the middle part of the outer wall of the chamber in the adjustable frame 112. When the connection screw 105 is released and the fasten pin 106 is pulled out, the coupling inclined angle between sliding kits 111 and load-bearing column 109 can be adjusted. Meanwhile, when the connection screw 108 is released and fasten pin 107 is pulled out, the saw body 102 can be raised to a required position in which a miter saw is formed, or pushed down to another required position therefore the whole apparatus would be converted to a proper table saw.

Referred to FIGS. 1 to 4, the following embodiment demonstrates the invention when the present invention is going to be a table saw. The dismountable cover kit comprising a demountable cover 104 of the adjustable frame and a removable cover 103 of the stationary stand can be taken away. A slot being arranged on demountable cover 104 corresponds with the saw disc 101. When the connection screw 115 and fasten pin 114 of the angle regulation fitting 110 are released, the saw body 102 can be rotated around the sliding kits 111 with 180 degree till the saw disc 101 is upwards. When the load-bearing column 109 is turned into a straight line with the connection beam 116 by releasing the connection screw 108 and pulling the fasten pin 107, the connection beam is perpendicular to the sliding kits, and the sliding kits 111 would be upwards. When pushing the sliding rods 111 into a horizontal position by releasing the connection screw 105 and pulling the fasten pin 106, the sliding rods can be pushed horizontally till the whole saw body 102 is completely placed in the chamber of the adjustable frame 112. When the dismountable cover kit is closed, the whole apparatus can act as a proper table saw.

The invention is not limited by the embodiments described above which are presented as examples only but can be modified in various ways within the scope of protection defined by the appended patent claims.

What is claimed is:

1. A dual functional electric saw, comprising a saw base, a saw body and a connection mechanism whereby the saw base and the saw body are jointed together, wherein said connection mechanism comprises a connection beam being a fastener of said saw base, a load-bearing column connected with said connection beam, sliding kits installed on the load-bearing column for leading the horizontal motion of said saw body in a cutting stroke, and an angle regulation fitting being capable of adjusting the cutting angle between work piece and saw disc with the sliding kits being an axis, one end of the angle regulation fitting is connected to the sliding kits while the other end is connected to the saw body permitting 180 degree rotation; said saw base comprises a dismountable cover kit and a stand set having a chamber being capable of accommodating the saw body for table sawing.

2. The dual functional electric saw according to claim 1, wherein said stand set comprises an adjustable frame having a chamber being capable of accommodating said saw body and a stationary stand around said adjustable frame for holding said adjustable frame.

3. The dual functional electric saw according to claim 1, wherein said dismountable cover kit comprises a demountable cover of said adjustable frame and a removable cover of said stationary stand.

4. The dual functional electric saw according to claim 1, wherein said connection beam is connected to the middle part of the outer wall of said chamber in said adjustable frame.

\* \* \* \* \*